(12) United States Patent
LaBarbera et al.

(10) Patent No.: US 9,423,048 B1
(45) Date of Patent: Aug. 23, 2016

(54) HANDLE WITH FLOW CONTROL

(71) Applicants: John LaBarbera, Poway, CA (US);
Vincent LaBarbera, Poway, CA (US);
Paul LaBarbera, Carlsbad, CA (US)

(72) Inventors: John LaBarbera, Poway, CA (US);
Vincent LaBarbera, Poway, CA (US);
Paul LaBarbera, Carlsbad, CA (US)

(73) Assignee: MYTEE PRODUCTS, INC., Poway, CA (US)

( * ) Notice: Subject to any disclaimer, the term of this patent is extended or adjusted under 35 U.S.C. 154(b) by 0 days.

(21) Appl. No.: 15/078,220

(22) Filed: Mar. 23, 2016

Related U.S. Application Data

(60) Provisional application No. 62/136,811, filed on Mar. 23, 2015.

(51) Int. Cl.
*A47L 11/34* (2006.01)
*F16K 31/60* (2006.01)
*A47L 9/24* (2006.01)
*A47L 11/40* (2006.01)

(52) U.S. Cl.
CPC ............... *F16K 31/602* (2013.01); *A47L 9/24* (2013.01); *A47L 9/242* (2013.01); *A47L 11/4075* (2013.01)

(58) Field of Classification Search
CPC ....... F16K 31/602; A47L 9/24; A47L 9/242; A47L 11/4075
IPC .................................................. A47L 11/34
See application file for complete search history.

(56) References Cited

U.S. PATENT DOCUMENTS

| 5,483,726 A | 1/1996 | Blase et al. |
| 5,542,147 A | 8/1996 | Merten |
| 5,891,198 A | 4/1999 | Pearlstein |
| 6,263,539 B1 | 7/2001 | Baig |

*Primary Examiner* — David Redding
(74) *Attorney, Agent, or Firm* — Themis Law

(57) ABSTRACT

A handle with flow control includes a holding portion having an elongated upper part with a cavity defined therein and a cylindrical lower part adapted to be coupled to and engage a vacuum tube; and a lever having an elongated upper member shaped to be removably inserted into the cavity of the holding portion when rotated, a cylindrical lower member shaped to surround the vacuum tube, and an appendage extending from the lower member, which rotates when the upper member is rotated and which causes an opening or closing of a valve coupled to the handle.

12 Claims, 8 Drawing Sheets

HANDLE WITH FLOW CONTROL

FIELD OF THE INVENTION

The present invention relates to a handle that enables flow control of a fluid. In one application, a handle with flow control according to the invention can be used to hold a vacuum hose of a cleaning machine and at the same time control flow of a cleaning solution distributed on a surface.

BACKGROUND OF THE INVENTION

Floor and upholstery cleaning machines include a vacuum tube that is connected to a cleaning head at one end and to a vacuum source at the other end. A nozzle, provided in or near the cleaning head, sprays a cleaning solution on a surface to be cleaned. The cleaning solution and dirt particles are then extracted and sucked into the cleaning head and the vacuum tube by the action of vacuum.

An operator moves the cleaning head along the surface to be cleaned by holding a handle coupled to the cleaning head with one hand while actuating, with the other hand, a lever also coupled to the vacuum tube that opens or closes a valve controlling the flow of the cleaning solution.

Examples of these types of cleaning machines are disclosed in U.S. Pat. No. 5,483,726 to Blase et al.; U.S. Pat. No. 5,542,147 to Merten; U.S. Pat. No. 5,891,198 to Pearlstein; and U.S. Pat. No. 6,263,539 to Baig.

FIG. 1 illustrates use of a floor cleaning machine according to the prior art. Vacuum tube 10 is held by the operator with both hands by gripping handle 12 provided on vacuum tube 10 with the left hand while at the same time holding the vacuum tube at a different point with the right hand. The flow of the cleaning solution sprayed on the surface to be cleaned is controlled by having the operator actuate control lever 14 with the right hand, opening or closing valve 16 which is disposed under vacuum tube 10.

Those hand positions are not ergonomic and after some time the operator becomes fatigued from holding and moving vacuum tube 10 with his arms spread apart while at the same time operating control lever 14.

Moreover, the cleaning solution is often hot and while the hand holding handle 12 is protected from the heat of the cleaning solution (provided that handle 12 is made of an insulating material), the other hand becomes inevitably exposed to heat after some time due to heat either transmitted or radiated from solution valve 16 to control lever 14. In addition, the disposition of the operator's hands in machines of the prior art is such that the hand which actuates control lever 14 may slide along tube 10 and come in contact with solution valve 16 and, therefore, become exposed to heat.

SUMMARY OF THE INVENTION

The present invention resolves the above described drawbacks of the prior art.

A handle with flow control according to the invention includes a holding portion, which is in fixed position, and a lever, which can be moved by an operator to control flow of a cleaning solution through a valve.

The holding portion is composed of an elongated upper part with a cavity defined therein and a cylindrical lower part adapted to be coupled to a vacuum tube, for example by clamping.

The lever instead is composed of an elongated upper member shaped to be removably inserted into the cavity in the holding portion when the upper member is rotated, a cylindrical lower member shaped to surround the vacuum tube, and an appendage that extends from the lower member and that rotates when the upper member is rotated, causing a valve coupled to the handle to be opened or closed.

The holding portion of the handle may also include a plate or bracket, which extends from the lower part of the holding portion in a position opposite to the upper part, and to which the valve may be coupled.

The appendage of the lever may be disposed between the lower part of the holding portion and the valve.

In one embodiment, the appendage includes a proximal portion that connects the appendage to the lower member of the lever, an enlargement disposed in an intermediate position and shaped to rotate on a protuberance of the valve, and a distal portion that causes the opening or closing of the valve. In one embodiment, the enlargement in the appendage is shaped as a cylinder disposed cross-wise to a longitudinal axis of the appendage, and the distal portion of the appendage is plate-shaped, in order to facilitate the compression of a stem on the valve that causes the valve to open.

In one embodiment, the holding portion of the handle includes a retaining part, which is coupled to a lower surface of the holding portion and which provides an upper seat to at least a portion of the appendage, limiting the upward movement of the appendage. The plate or bracket that supports the valve may be attached to a side wall of the retaining part.

The lever may further comprise an intermediate member, which is disposed between the upper and lower members and which arches outwardly from a lower end of the upper member to connect with the lower member. That construction enables the lower member to be disposed at a distance along the vacuum tube from the upper member.

In one embodiment, the holding portion includes an intermediate part provided between the upper part, which is then shorter, and the lower part of the holding portion. In that embodiment, the intermediate part has a cavity defined therein, which is connected to the cavity on the upper part and is shaped to receive the intermediate member of the lever.

In one embodiment, the lever is disposed distally of the holding portion and of an operator.

In one embodiment, a second handle is provided that is adapted to be coupled to the vacuum tube at a distance from the handle with flow control.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF EMBODIMENTS OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

A preferred embodiment will be described, in which a handle with flow control according to the invention is used in conjunction with a floor or upholstery cleaning machine.

Figure 1:
FIG. 1 illustrates a handle and a flow control lever for a floor cleaning machine according to the prior art.
Figure 2:
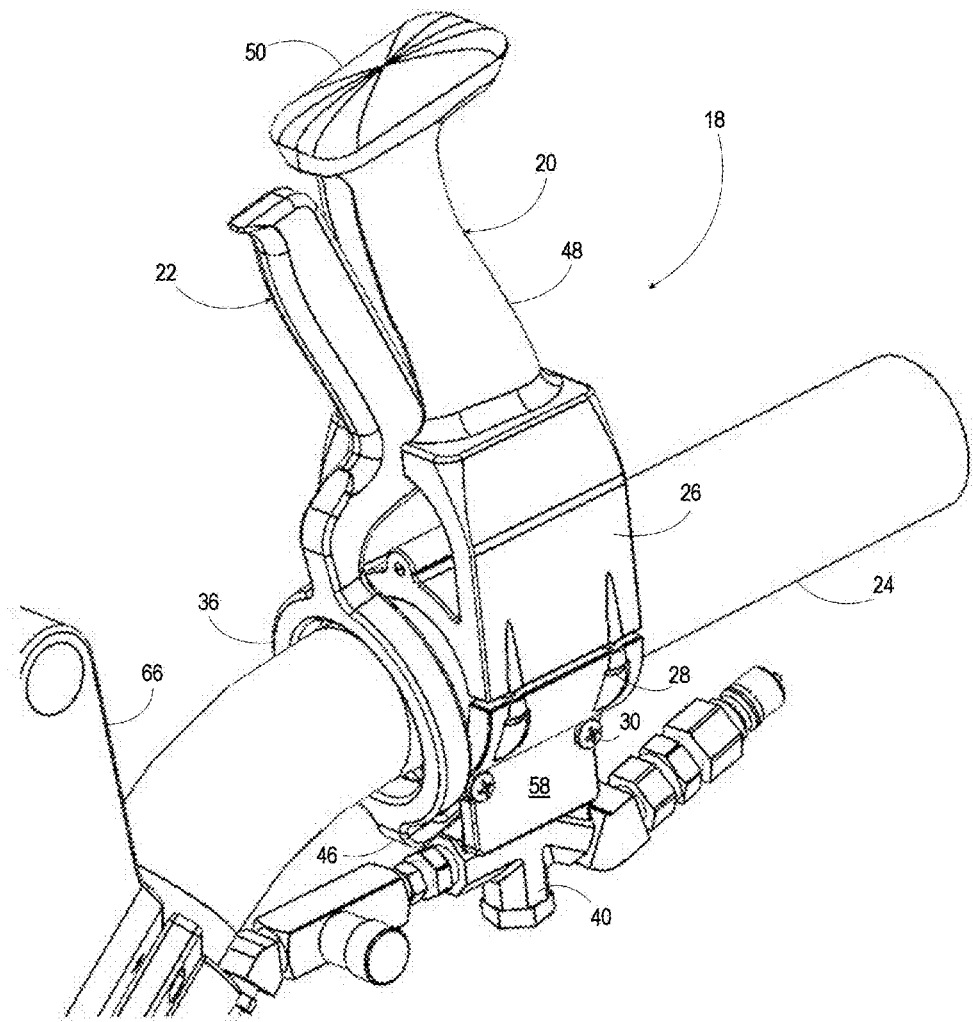
FIG. 2 is a perspective view of a handle with flow control according to the invention.

With reference to FIG. 2, a handle with flow control 18 according to the invention includes a holding portion 20, which is in fixed position, and a lever 22, which can be moved by an operator to control flow of a cleaning solution through a valve 40.

Holding portion 20 includes an upper part 48, which is shaped to be grasped by the operator, and a cylindrical lower part 26, which is coupled to a vacuum tube 24. In the illustrated embodiment, upper part 48 is elongated and ergonomically shaped, with a curved profile that fits between the thumb and the index fingers of the operator's hand. Upper part 48 also has a cap 50 that retains the operator's hand in position.

Figure 5:
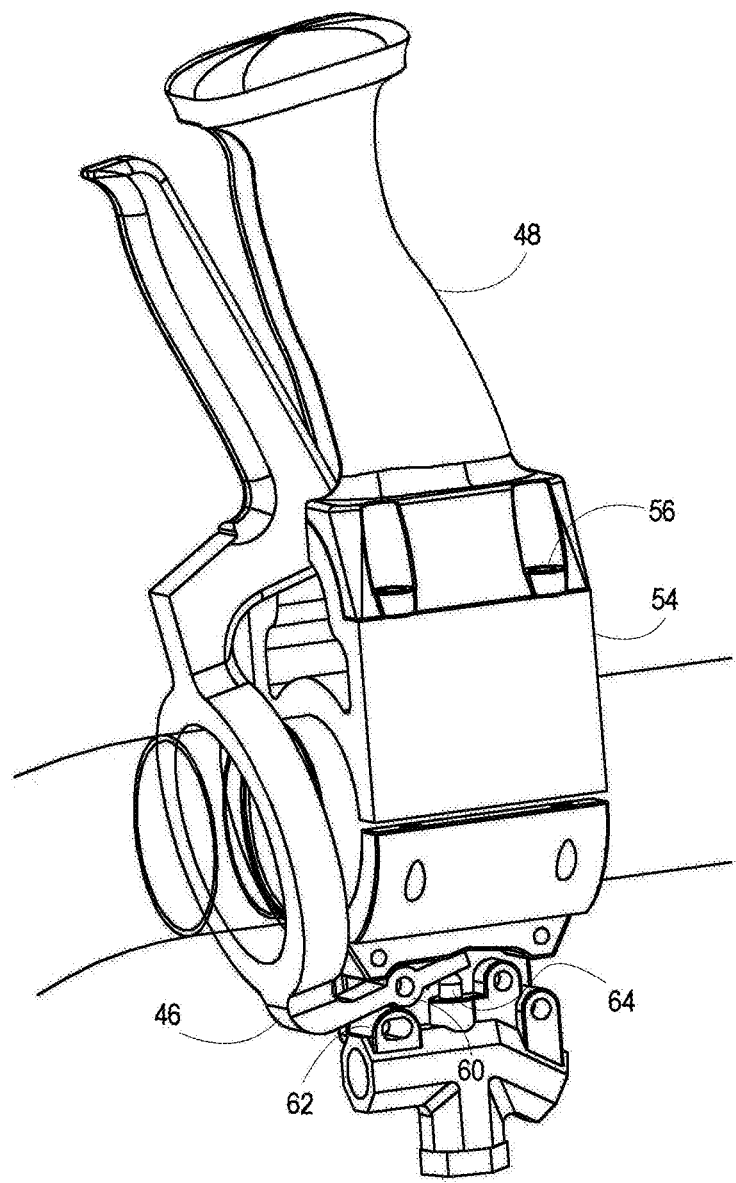
FIG. 5 is a further perspective view of a handle according to the invention, which includes an intermediate part disposed between the upper and lower parts of the holding portion.

FIG. 2 shows upper part 48 as made of a single piece that is connected to lower part 26 but in another embodiment, shown in FIG. 5, upper part 48 is shorter and an intermediate part or spacer 54 is provided between upper part 48 and lower part 26. Upper part 48 and intermediate part 54 are joined to each other, for example with screws 56.

Lower part 26 has a cylindrical shape configured to be clamped around vacuum tube 24. In the illustrated embodiment, lower part 26 is made two longitudinal halves that are joined together with screws 30. In one embodiment, upper part 48 and the upper half of lower part 26 are made as a single piece and are joined to the lower half of lower part 26 with fasteners, for example, with screws 28.

Figure 3:
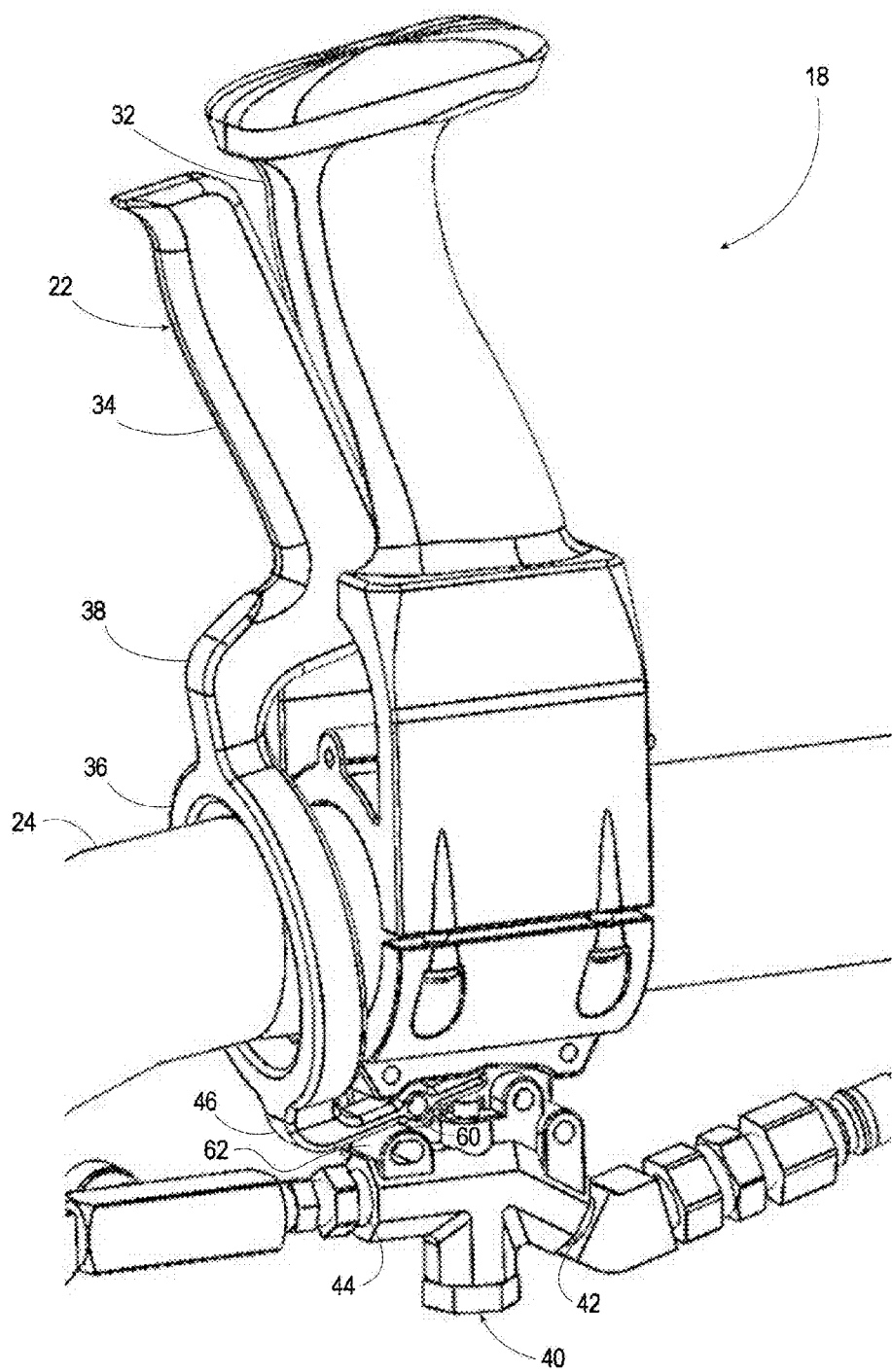
FIG. 3 is a different perspective view of the handle of FIG. 2 and illustrates the handle in rest position.
Figure 4:
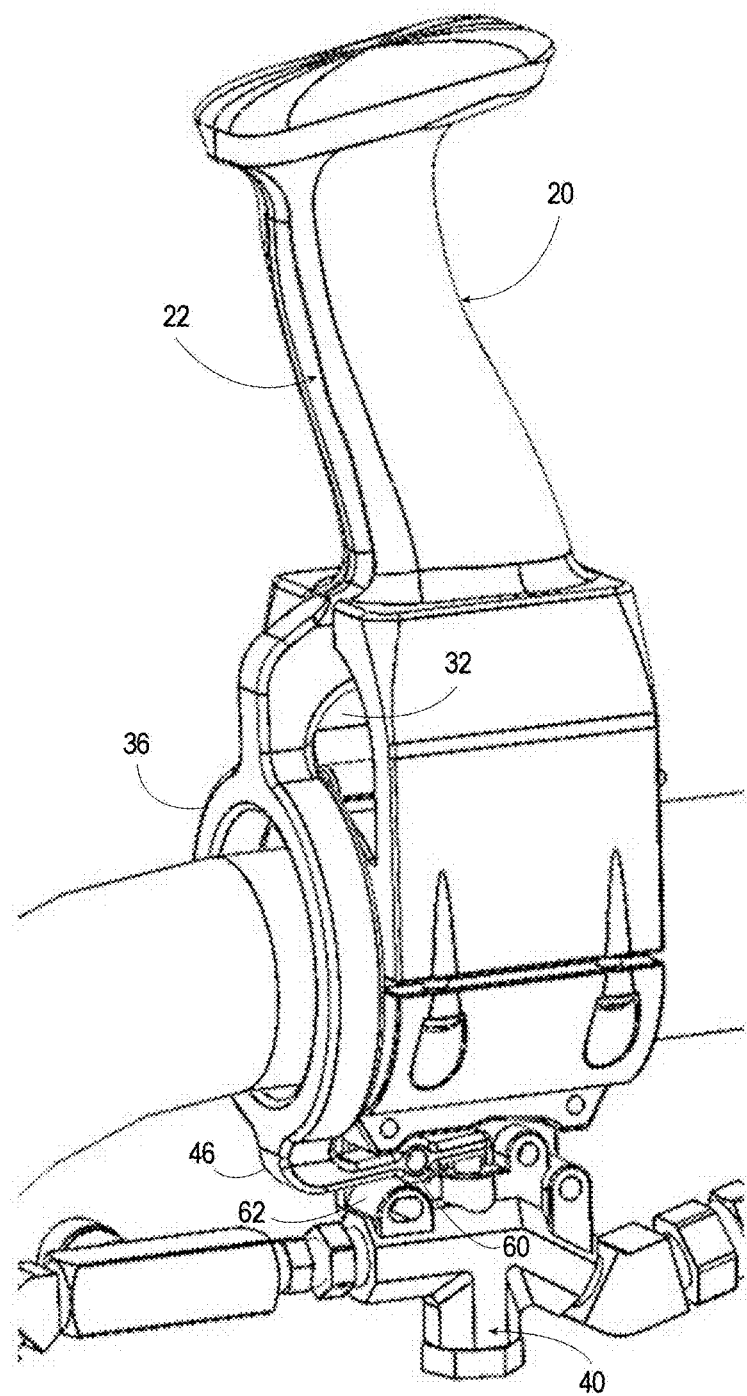
FIG. 4 is another perspective view of the handle of FIG. 2 and illustrates the handle in operating position.

Turning now to FIGS. 3 and 4, lever 22 is disposed in front of holding portion 20 when not in use, distally from the operator, as shown in FIG. 3, and becomes lodged within a cavity 32 defined in the front or distal face of holding portion 20 when actuated by the operator, as shown in FIG. 4.

Lever 22 includes an upper member 34, which has an elongated and outwardly bowed shape for best ergonomic fit, in order to enable the operator to wrap his finger around upper member 34 with greater comfort, thereby reducing fatigue during use.

Lever 22 further includes a lower member 36 of essentially cylindrical shape, shaped like a ring that surrounds vacuum tube 24, such that lower member 36 can move along vacuum tube 24 when upper member 34 is compressed into, or released from, cavity 32. Upper member 34 and lower member 36 of lever 22 are connected by an intermediate member 38, which arches outwardly from a lower end of upper member 34 to accommodate the relative positions and motions of upper member 34 and lower member 36.

Accordingly, cavity 32 may be shaped at its lower end to receive intermediate member 38 when lever 22 is rotated into cavity 32.

Figure 6:
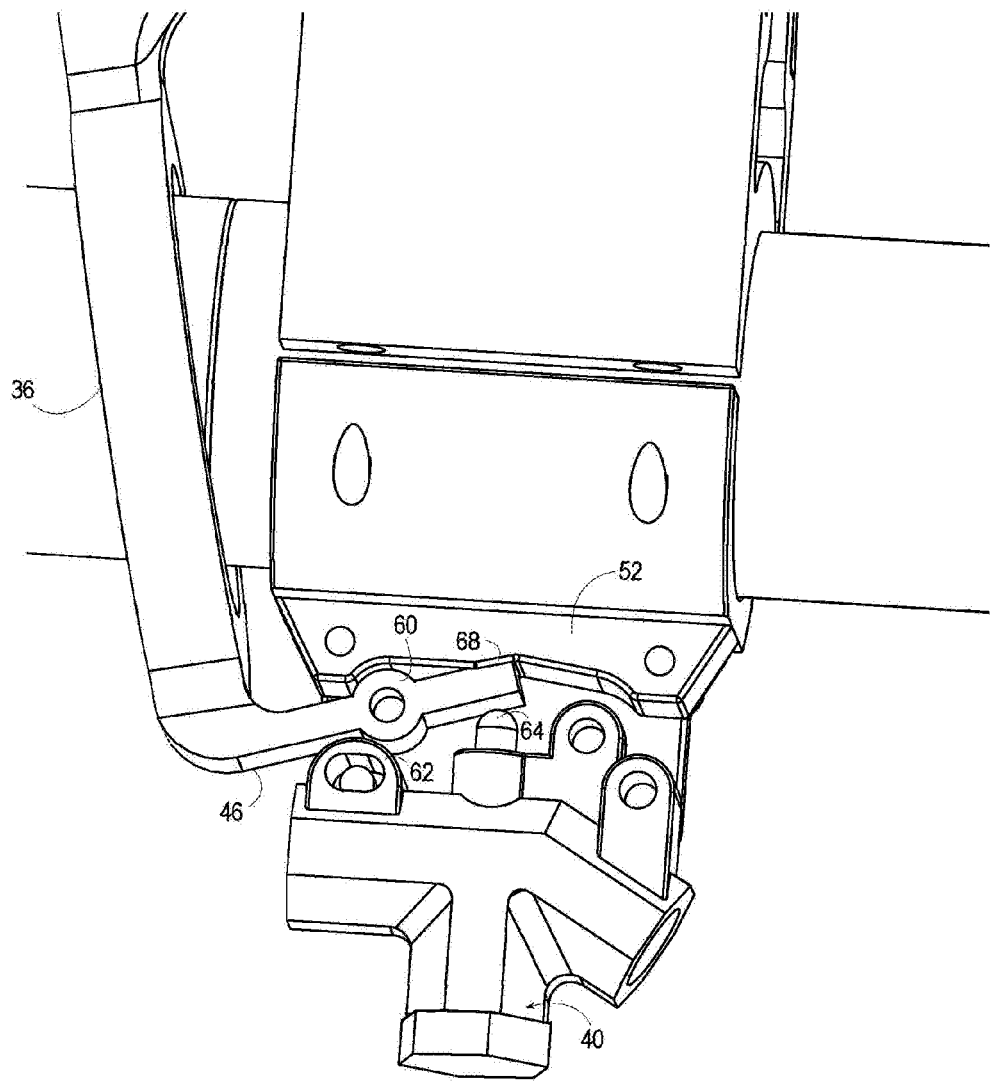
FIG. 6 is a detail view of the lower portion of the handle of FIG. 2.

Referring to FIGS. 3 6, the flow of the cleaning solution is controlled by valve 40, which in one embodiment may be a spring valve. The cleaning solution is fed to valve 40 through an inlet 42 and is delivered by valve 40 through an outlet 44. Valve 40 is connected to handle 18 by means of a plate or bracket 58, which extends downwardly from handle 18 in a position opposite to upper part 48. Plate 58 may be attached to handle 18 by fasteners such as screws 30 or may be integral with handle 18. In the illustrated embodiment, valve 40 is attached to an interior side of plate 58, for example with fasteners.

Referring now to FIGS. 3, 5 and 6, lever 22 is operatively connected to valve 40 by means of an appendage 46, which extends outwardly of lower member 36. In the illustrated embodiment, appendage 46 includes an enlargement 60, which is disposed between the proximal and distal portions of appendage 46 and above a protuberance 62 of valve 40. Enlargement 60 may have a variety of shapes. In the illustrated embodiment, enlargement 60 is configured as a hollow cylinder having a longitudinal axis that is perpendicular to the longitudinal axis of appendage 46.

When lever 22 is compressed into cavity 32 of holding portion 20, appendage 46 rotates because enlargement 60 acts as a fulcrum over protuberance 62. The rotation of appendage 46 causes the distal portion of appendage 46 to compress stem 64 of valve 40, enabling the flow of the cleaning solution through valve 40. FIG. 4 illustrates stem 64 in compressed condition when lever 22 is compressed against holding portion 20. To facilitate that compressive action, the distal portion of appendage 46 may be flat-shaped.

Conversely, when lever 22 is released from holding portion 20, appendage 46 rotates backward, removing pressure from stem 64 and causing valve 40 to close. That terminates the flow of the cleaning solution through valve 40.

As shown more clearly in FIG. 6, holding portion 20 may also include a retaining part 52, which is coupled to a lower surface of lower part 26. Retaining part 52 provides, on its lower surface, a seat 68 for at least a portion of appendage 46, which limits the upward movement of appendage 46 by providing an upward stop to a portion of appendage 46, for example to the distal part of appendage 46.

During use, the operator will hold handle 18 with one hand and may hold a second, optional handle 66 (partially shown in FIG. 2) with the other hand.

Figure 7:
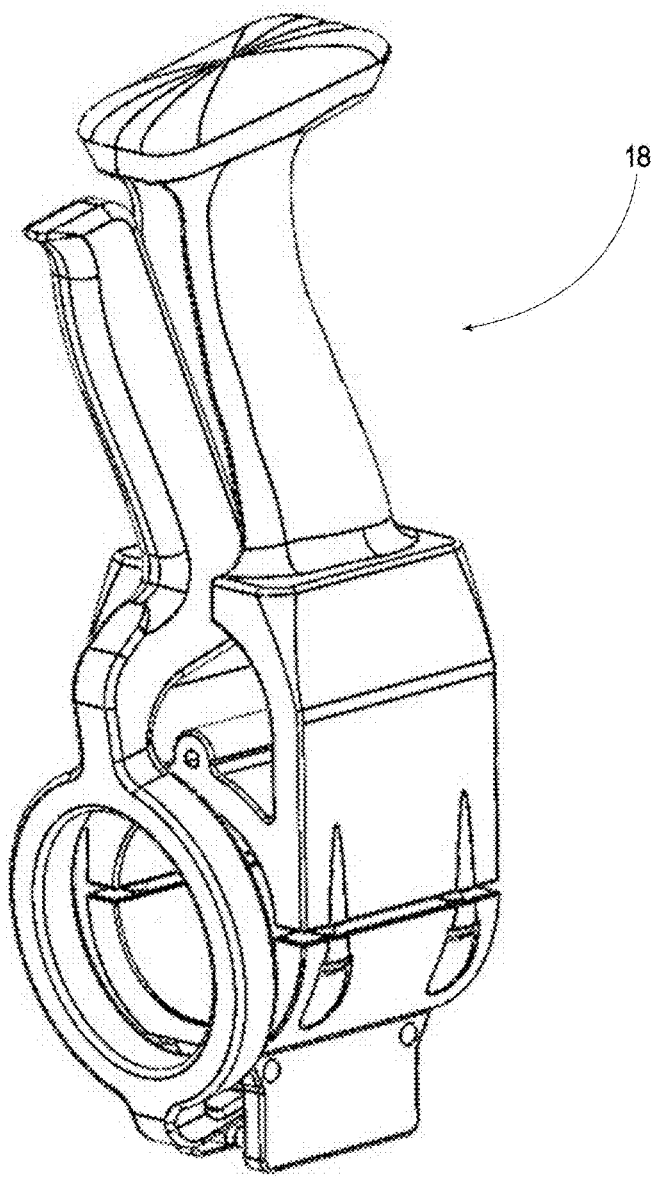
FIG. 7 is a perspective view of the handle of FIG. 2 without the vacuum tube.

FIG. 7 illustrates an embodiment of a handle with flow control according to the invention, without showing the vacuum tube.

Figure 8:
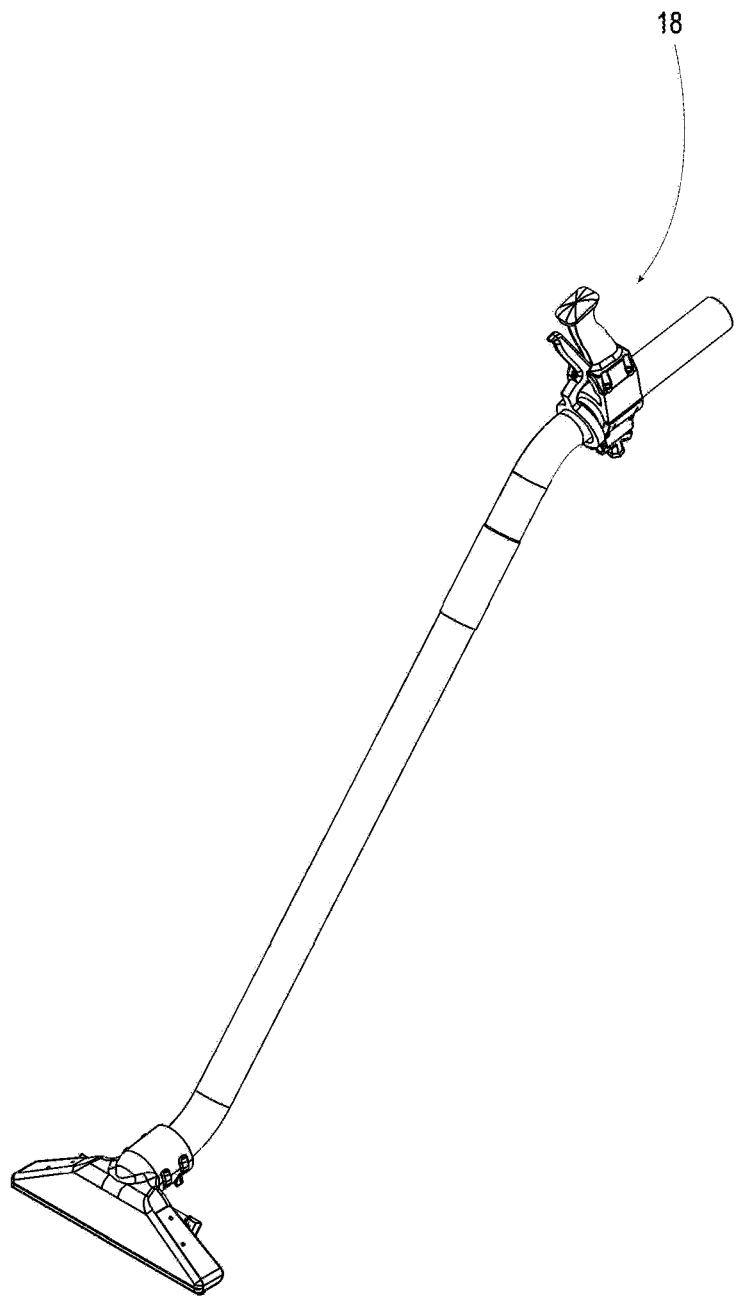
FIG. 8 illustrates the handle of FIG. 2 in an environment of use.

FIG. 8 illustrates a handle with flow control according to the invention in an environment of use, more specifically, used in conjunction with a floor cleaning machine. A person of skill in the art will appreciate that the presently described handle with flow control provides for a more comfortable use of a floor or upholstery cleaning machine by an operator and also prevents the burns that may occur with designs in the prior art.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:
1. A handle with flow control comprising:
a holding portion having,
  an elongated upper part with a cavity defined therein, and
  a cylindrical lower part adapted to be coupled to and engage a vacuum tube; and a lever having,
  an elongated upper member shaped to be removably inserted into the cavity upon rotation of the upper member,
  a cylindrical lower member shaped to surround the vacuum tube, and
  an appendage extending from the lower member,
wherein the appendage is caused to rotate upon the rotation the upper member, thereby causing an opening or closing of a valve coupled to the handle.
2. The handle with flow control according to claim 1, wherein the holding portion further comprises a plate or bracket extending from the lower part in a position opposite to the upper part, and wherein the valve is coupled to the bracket.
3. The handle with flow control according to claim 2, wherein the appendage is disposed between the lower part of the holding portion and the valve.
4. The handle with flow control according to claim 3, wherein the appendage comprises,
a proximal portion that connects the appendage to the lower member of the lever,
an intermediate portion comprising an enlargement, which configured to rotate on a protuberance of the valve, and
a distal portion that causes the opening or closing of the valve.
5. The handle with flow control according to claim 4, wherein the enlargement is shaped as a cylinder disposed cross-wise to a longitudinal axis of the appendage.
6. The handle with flow control according to claim 4, wherein the distal portion is plate-shaped, such to compress a stem on the valve, thereby causing the opening of the valve.
7. The handle with flow control according to claim 4, wherein the holding portion further comprises a retaining part coupled to a lower surface of the lower part, the retaining part providing an upper seat to at least a portion of the appendage, thereby limiting an upward movement of the appendage.
8. The handle with flow control according to claim 7, wherein the plate or bracket is coupled to a side wall of the retaining part.
9. The handle with flow control according to claim 1, wherein the lever is disposed in distal position in relation to the holding portion and to an operator.
10. The handle with flow control according to claim 1, wherein the lever further comprises an intermediate member disposed between the upper and lower members, the intermediate member arching outwardly from a lower end of the upper member to connect with the lower member, thereby enabling the lower member to be disposed distally of the upper member.
11. The handle with flow control according to claim 10, wherein the holding portion further comprises an intermediate part connecting the upper and lower parts of the holding portion, the intermediate part having a cavity defined therein connected to the cavity on the upper part and shaped to receive the intermediate member of the lever.
12. The handle with flow control according to claim 1, further comprising a second handle configured to be coupled to the vacuum tube at a distance from the handle with flow control.

* * * * *